United States Patent [19]

Yamada

[11] Patent Number: 4,926,707

[45] Date of Patent: May 22, 1990

[54] ACTUATOR FOR AUTOMOTIVE DOOR LOCKING DEVICE

[75] Inventor: Shinjiro Yamada, Utsunomiya, Japan

[73] Assignee: Mitsui Kinzoku Kogyo Kabushiki Kaisha, Tokyo, Japan

[21] Appl. No.: 252,921

[22] Filed: Oct. 4, 1988

[30] Foreign Application Priority Data

May 1, 1986 [JP] Japan ................................ 61-101807

[51] Int. Cl.[5] .......................... F16H 25/18; E05C 3/26

[52] U.S. Cl. .......................................... 74/96; 74/107; 74/567; 74/569; 292/201

[58] Field of Search ................... 74/96, 107, 567, 569; 292/201

[56] References Cited

U.S. PATENT DOCUMENTS 691,968 1/1902 Paine .................................. 74/96 X 4,315,691 2/1982 Perkins et al. .................... 74/569 X 4,518,181 5/1985 Yamada .............................. 292/201

FOREIGN PATENT DOCUMENTS 58-207468 2/1983 Japan .

*Primary Examiner*—Allan D. Herrmann

[57] ABSTRACT

Actuator for locking device of doors and trunks of automobiles comprising a rotating member that is rotated by a power source; a cam groove formed in the rotating member; a cam follower that moves along the cam groove;

and a displacement member which moves between a first position and a second position as a result of the movement of the cam follower. If the cam follower should stop in a communicating groove, the disk can be rotated by a small motor or the cam follower can be operated normally under circumstances when the motor fails.

3 Claims, 11 Drawing Sheets

ACTUATOR FOR AUTOMOTIVE DOOR LOCKING DEVICE

FIELD OF THE INVENTION

This invention relates to an actuator for the locking device of doors and trunks in automobiles and more particularly to an actuator that changes over the locking device between the lock position and the unlock position by a motor.

PRIOR ART

An actuator that changes over the locking device of doors and trunks in automobiles between the lock position and the unlock position has been known. Various types of such actuators have been proposed. The actuators of this kind must meet the following requirements.

(1) Since it is installed in the inner space of doors, the actuator must be small and have high power.

(2) The locking device must be able to be manually switched lightly between the lock position and the unlock position.

As an example of the actuator that meets the above requirements, one (that was disclosed by the Japanese Patent Laid-Open No. 207468/1983) may be cited in which an annular cam groove is formed on the side surface of a disk that is rotated by a motor and in which a cam follower is engaged with the cam groove to switch the locking device between the lock position and the unlock position by the movement of the cam follower.

The structure of the actuator cited above is explained by referring to FIGS. 9 through 11. The cam groove 70 indicated by the solid line is formed in a spiral shape with one end 70*a* located farthest from the rotating center and the other end 70*b* nearest to the rotating center and with the ends 70*a* and 70*b* connected with a groove 71 formed along the diameter line of the rotating disk 62. A cam follower 76 formed at one end of a lever 75 is engaged with the cam groove 70 and when the disk 62 is rotated by a motor, the cam follower 76 slides along the cam groove 70 to be moved in the radial direction of the disk causing the lever 75 to pivot about a shaft 74. At this time the lever 75 is applied with a high rotating torque by the wedge effect of the cam groove 70. The lever 75 is connected, through a lever 80, with a lock lever 31 that switches the locking device between the lock position and the unlock position. When the locking device is manually operated, the lock lever 31 is turned to rotate the lever 75. This causes the cam follower 76 to move between the ends 70*a* and 70*b* of the cam groove 70 through the radial groove 71 with the motor not energized.

The cam follower 76 normally stops at the end 70*a* or 70*b* of the cam groove 70 and not in the middle of the communicating groove 71. However, when the manual switching is made between the lock and the unlock position, the cam follower 76 moves between the ends 70*a* and 70*b* of the cam groove 70 through the communicating groove 71, so that the cam follower 76 may at times stop in the communicating groove 71. In such a case, when an attempt is made to turn the disk 62 by the motor, the cam follower 76 abuts against the walls of the communicating groove 71 so that the disk 62 cannot be rotated.

To avoid this problem, the cited Japanese Patent Application also proposes to form a curved chamfer on the cam groove 70.

With the provision of the curved chamfer alone, however, the cam follower 76 may not sometimes be moved by the rotating force of a small motor, depending on the pressure angle between the cam follower 76 and the curved chamfer. This will be detailed later in the description of the preferred embodiment of the invention.

The above example has still another disadvantage that when the cam follower 76 has moved to a position where the direction of movement of the cam follower 76 is perpendicular to the curved chamfer portion and the actuator motor fails, the disk 62 cannot be rotated even by manually moving the cam follower 76.

OBJECT OF THE INVENTION

The object of the invention is to provide an actuator for an automotive locking device in which when the cam follower should stop in the communicating groove, the disk can be rotated by a small motor.

Another object of the invention is to provide an actuator for an automotive locking device which under any circumstance the cam follower can be operated manually.

DESCRIPTION OF PREFERRED EMBODIMENT

One embodiment of the invention will now be explained by referring to the attached drawings. The locking device shown in its entirety in FIG. 1 has a synthetic resin body 2, a metal cover plate 3 mounted on the front of the body 2, and a metal back plate 19 mounted on the back of the body 2. A recess is formed between the body 2 and the cover plate 3 to accommodate a known latch mechanism described later. On the back of the body 2 is installed a control mechanism for actuating the latch mechanism. The body 2, the cover plate 3 and the back plate 19 are riveted together and mounted to the door of an automobile.

Figure 3:
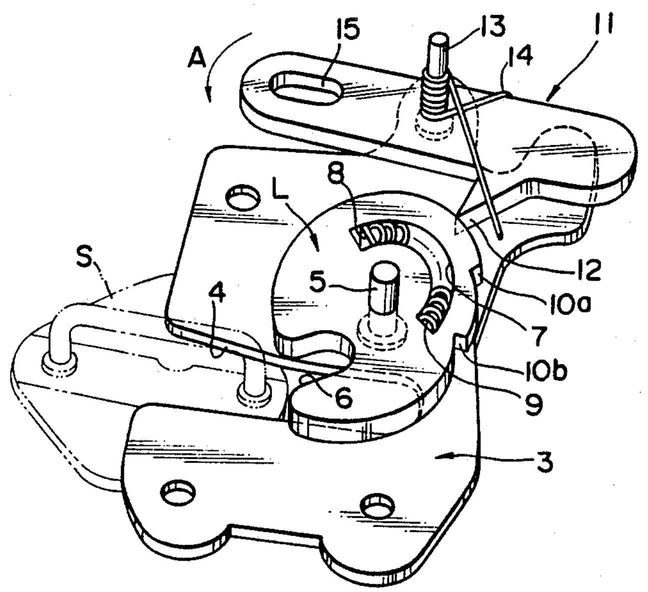
FIG. 3 is a perspective view of a latch and a ratchet of door locking device.
Figure 4:
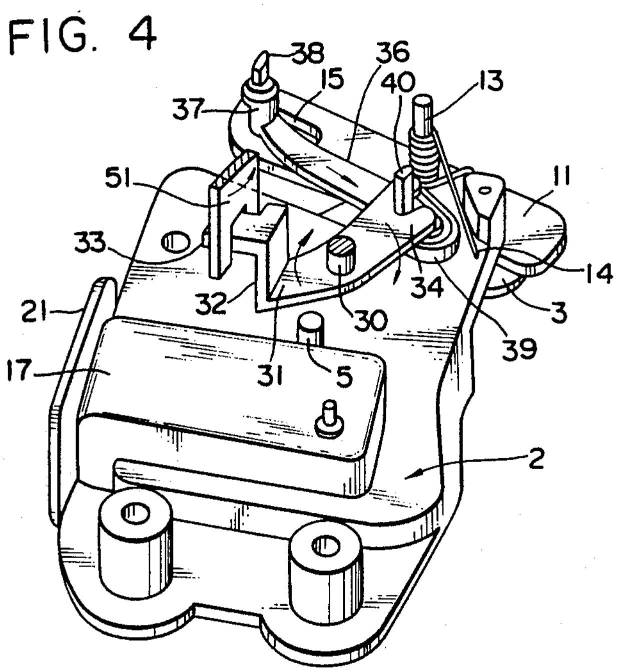
FIG. 4 is a perspective view of a lock mechanism of the automotive door locking device.

As shown in FIG. 3, the cover plate 3 is provided with a guide groove 4 into which a striker S fixed to the car body advances. Rotatably mounted on the cover plate 3 by a shaft 5 is a latch L that engages with the striker S. The shaft 5 projects through the back of the body 2, as shown in FIG. 4. The latch L has an arc slot 7 with its center at the shaft 5 in which a compression spring 9 is installed. One end of the spring 9 is brought into contact with a raised projection 8 formed on the cover plate 3 to urge the latch L in the clockwise direction. When the striker S moves to the right through the guide groove 4 in FIG. 3, it engages with an engagement groove 6 of the latch L to turn the latch L counterclockwise.

A ratchet 11 is rotatably supported on the cover plate 3 through a shaft 13. The ratchet 11 is urged in the direction opposite to the arrow A by the action of a spring 14. Thus, when the latch L is turned by the striker S, a pawl 12 of the ratchet 11 engages with a half-latch notch 10*a* and then a full-latch notch 10*b* successively to prevent the reverse rotation of the latch L. When the pawl 12 is engaged with a full-latch notch 10*b*, this is called a full-latch state. To cancel the full-latch state requires rotation of the ratchet 11 in the direction of an arrow A by the control mechanism of the latch mechanism to be described later.

As shown in FIG. 4, at that portion of the body 2 facing the guide groove 4 is formed a recess 17 into which the striker S can advance. The inlet of the recess 17 is provided with a flange 21.

At the back of the body 2 is formed a shaft 30 projecting rearwardly on which a lock lever 31 is rotatably mounted. The lock lever 31 has a riser 32 formed at one end which has an engagement projection 33 at its end. The engagement projection 33 is engaged with a forked member 51 which is coupled with a known sill knob provided to the door. At the other end the lock lever 31 has a fork 34.

An engagement piece 37 formed at one end of a connecting link 36 is slidably engaged with a slot 15 of the ratchet 11. An abutting piece 38 is formed on the top of the engagement piece 37. On the other end of the connecting link 36 a pin 40 projects rearwardly to engage with the fork 34 of the lock lever 31. When the lock lever 31 is rotated about the shaft 30, the lever movement is transmitted through the engagement between the pin 40 and the fork 34 to the connecting link 36 whose end at the pin 40 then moves along the guide 39 formed in the body 2 causing the engagement piece 37 to move in the slot 15.

Figure 5:
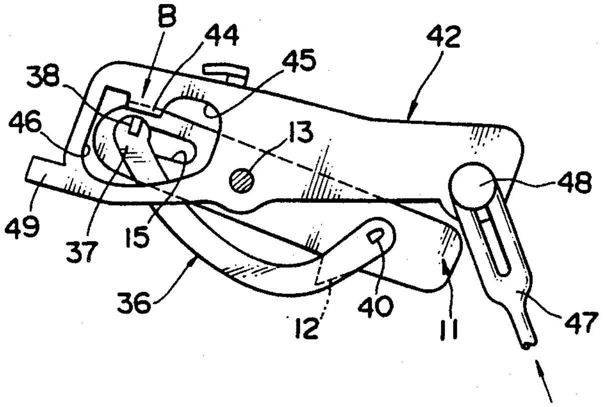
FIG. 5 is a plan view showing an open lever, a link and a ratchet in the unlocked state.
Figure 6:
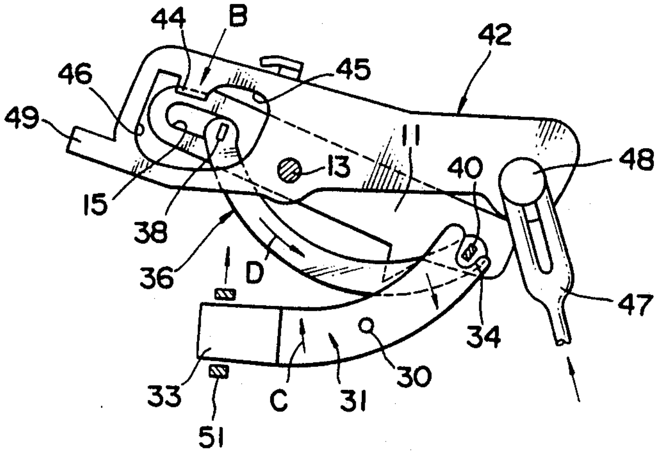
FIG. 6 is a plan view showing the relationship between the open lever, link and lock lever in the locked state.

As shown in FIG. 5 and 6, an open lever 42 is rotatably supported on the shaft 13 mounted on the cover plate 3. The open lever 42 is urged by a spring (not shown) to rotate clockwise.

The open lever 42 has an opening 46 at one end in which are formed an abutting projection 44 and a recess 45. The abutting piece 38 of the connecting link 36 is inserted into the opening 46. An operation link 47 is connected through a pin 48 to the other end of the open lever 42. The other end of the operation link 47 is connected to a door opening member provided to the outer side of the door. A projection 49 of the open lever 42 is connected to a door opening member, though not shown, provided to the inner side of the door.

The locking device of FIG. 5 is in the unlocked state where the abutting piece 38 opposes the abutting projection 44. In this condition, when the door opening member on the outside or inside of the car is operated, the open lever 42 rotates counterclockwise, moving the abutting piece 38 in the direction of an arrow B. The engagement piece 37 that holds the abutting piece 38 rotates the ratchet 11 in the direction of an arrow A of FIG. 3, disengaging the pawl 12 of the ratchet 11 from the latch L. When, as shown in FIG. 6, the abutting piece 38 is facing the recess 45, the locking device is locked. In this condition when the open lever 42 is rotated counterclockwise by the operation of the door opening member on the outside or inside of the car, the abutting piece 38 is trapped into the recess 45, leaving the ratchet 11 as it is, i.e., the ratchet 11 is not turned.

Switching between the lock position and the unlock position is done by the lock lever 31 which is operated either by the operation of the sill knob or door key, or by the actuator powered by a motor. In the following, detailed description is made of the actuator.

Figure 1:
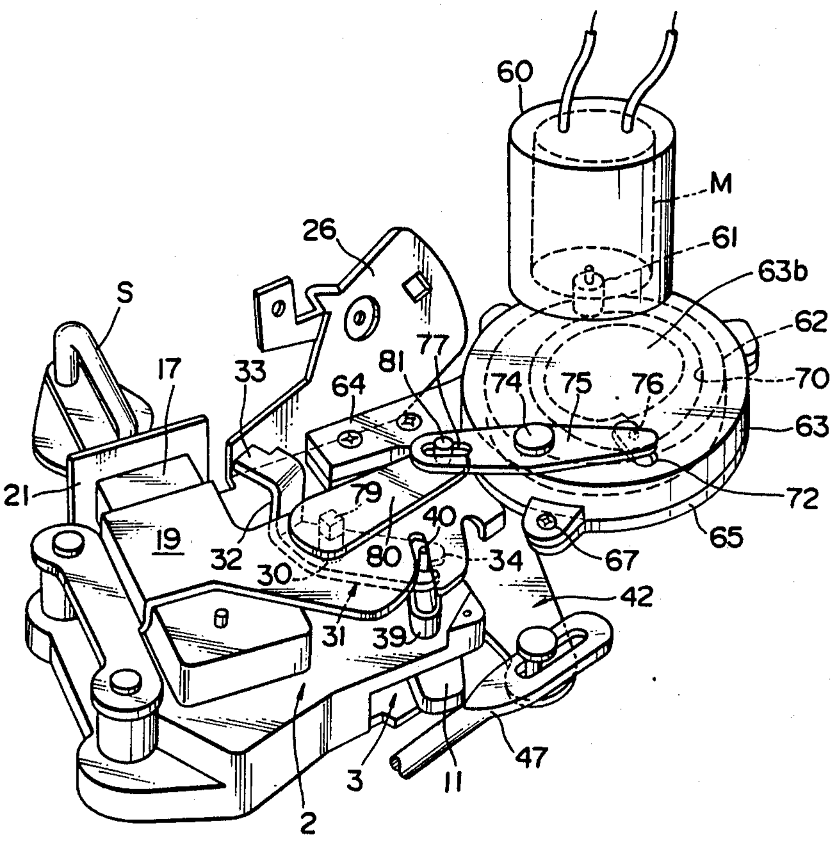
FIG. 1 is a perspective view of an automotive door locking device using an actuator of this invention.
Figure 2:
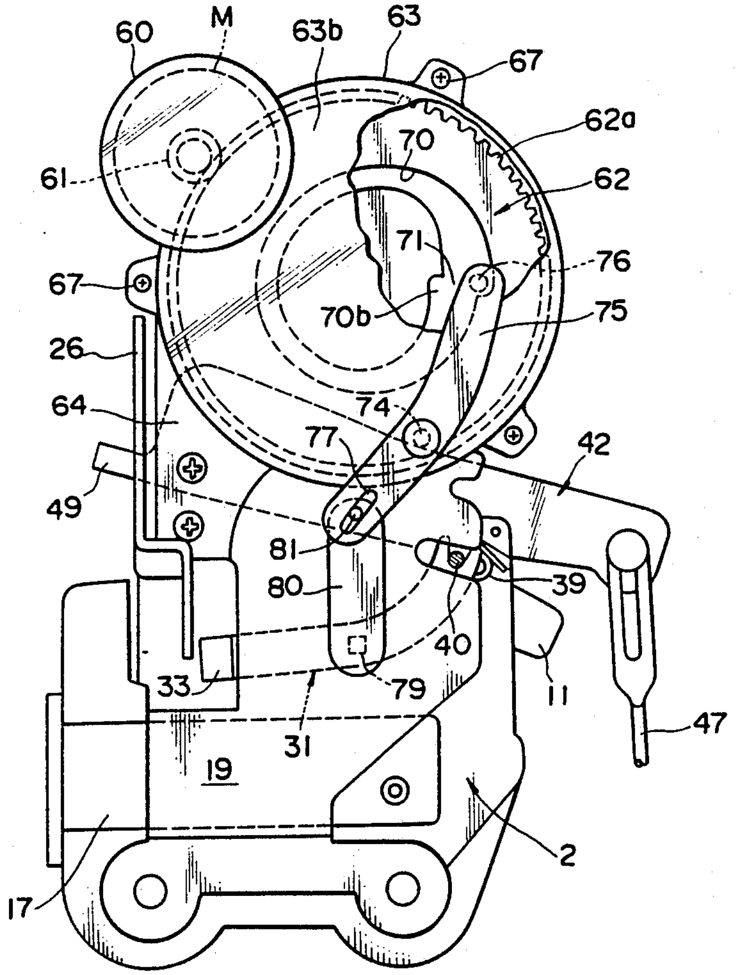
FIG. 2 rear view of the automotive door locking device.

Referring to FIGS. 1 and 2, a motor M is installed in a case 60 and its output shaft has a pinion 61 which is engaged with teeth 62*a* formed on the outer periphery of the disk 62. The disk 62 is rotatably installed in a short cylinder case 63. A support plate 65 is mounted to the bottom of the case 63 with screws 67 and also secured to the back plate 19 through a mounting arm 64. The case 60 and the short cylinder case 63 are preferably formed integrally of synthetic resin.

Figure 7:
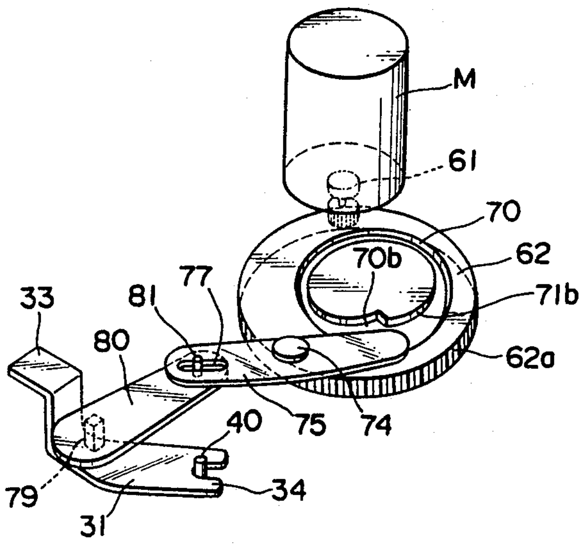
FIG. 7 is a perspective view showing the relationship between, a motor, a rotating disk, a cam groove, a follower lever, an intermediate lever and a lock lever.
Figure 8:
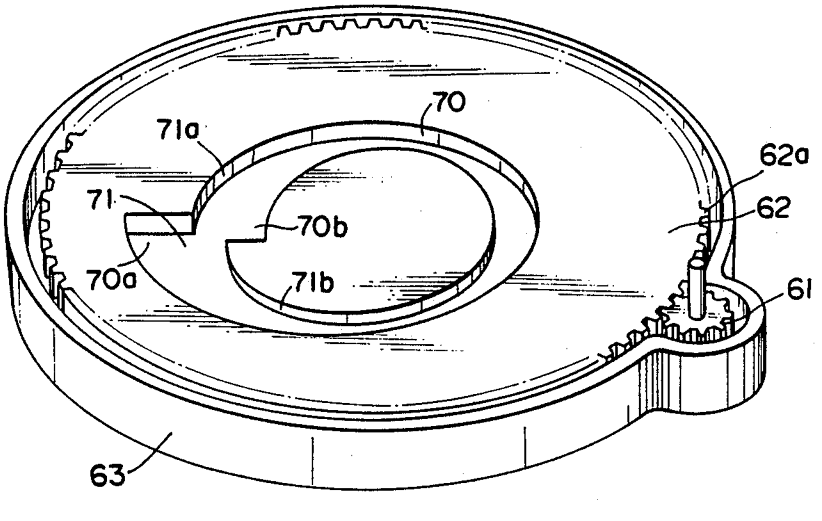
FIG. 8 is a perspective view showing the detail of the rotating disk.

The rotating disk 62 has a cam groove 70 formed on its surface, as shown in FIG. 7 and 8. The cam groove 70 is formed in a spiral shape and has one end 70*a* positioned farthest from the rotating center and the other end 70*b* closest to the rotating center. These two ends 70*a* and 70*b* are connected by a groove 71 formed along the diametric line of the disk 62.

A cover plate 63*b* on the top of the short cylinder case 63 has an aperture 72 with the width almost equal to that of the communicating groove 71. A follower lever 75 is pivotably mounted on the cover plate 63*b* through a shaft 74. At one end of the follower lever 75 is formed a cam follower 76 that engages with the cam groove 70 through the aperture 72. A slot 77 is formed at the other end of the follower lever 75.

A square rod 79 is rotatably sleeved over the rotating shaft 30 of the lock lever 31 and has its lower end secured to the lock lever 31. The upper end of the square rod 79 projects rearwardly through and beyond the back plate 19 and is fixed with one end of an intermediate lever 80. Thus, the intermediate lever 80 and the lock lever 31 rotate as one piece. The intermediate lever 80 has a pin 81 projecting at the other end which is engaged with the slot 77 of the follower lever 75.

Figure 10:
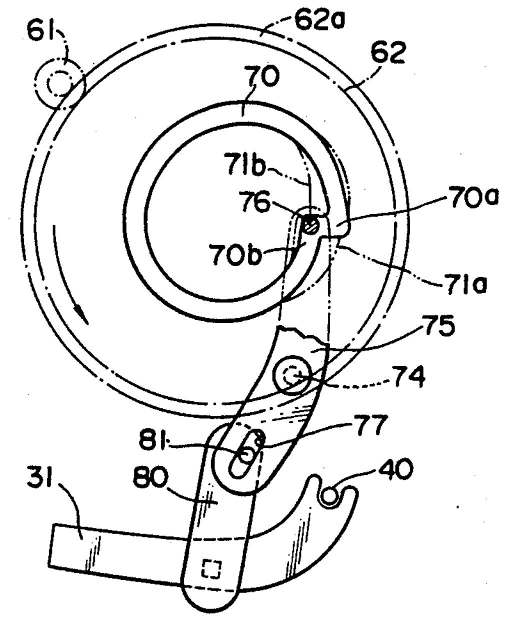
FIGS. 10 and 11 are explanatory drawing showing the switching of the lock lever.
Figure 11:
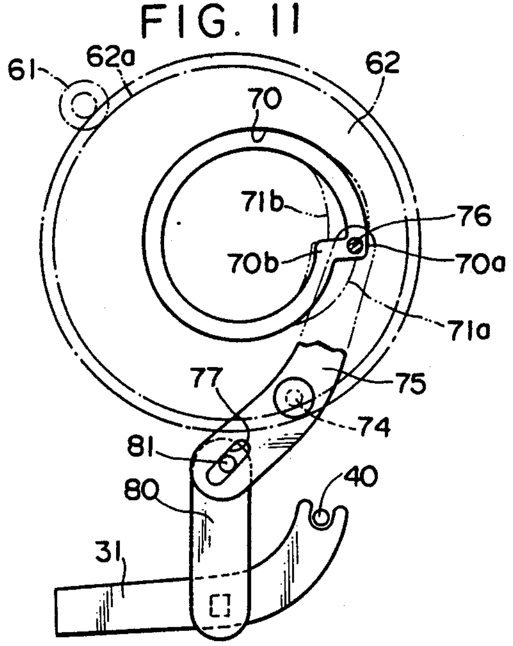

With the cam follower 76 engaged with one end 70*b* of the cam groove 70 as shown in FIG. 10, when the disk 62 is turned counterclockwise by the motor M, the cam follower 76 moves to the right along the cam groove 70 until it abuts against the other end 70*a* of the cam groove 70 as shown in FIG. 11. During this movement, the follower lever 75 is turned clockwise about the shaft 74 causing the intermediate lever 80 to turn counterclockwise about the shaft 30, with the result that the lock lever 31 secured to the intermediate lever 80 through the square rod 79 is also turned counterclockwise to be switched from the lock position to the unlock position.

Figure 12:
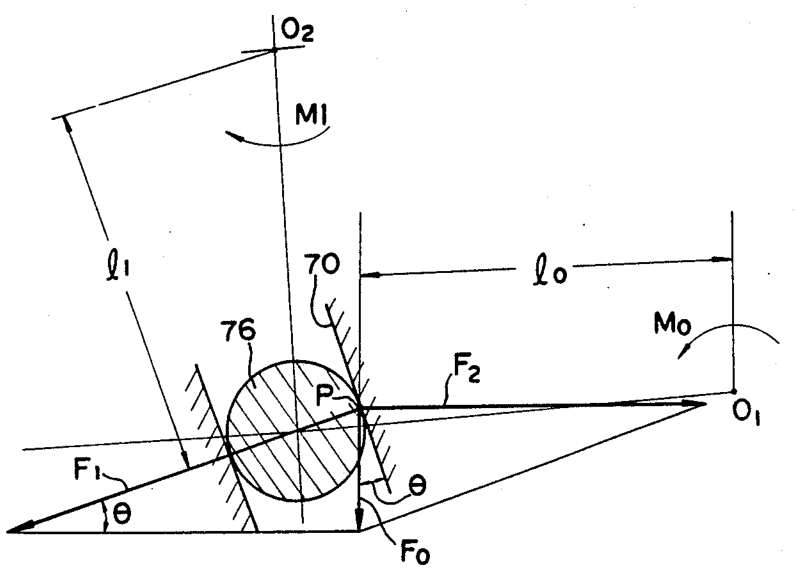
FIG. 12 is an explanatory drawing showing the dynamical effect of the force amplification effect.

Next, we will explain a sort of wedge effect of the cam groove 70 on the cam follower 76 by referring to FIG. 12. In the figure reference numeral 01 represents the rotating center of the disk 62 and P signifies the contacting point between the cam follower 76 and the side wall of the cam groove 70. The line connecting the contact point P and the rotating center 01 is not at the right angle with the side wall of the cam groove 70. The rotating center of the pivoting shaft 74 of the follower lever 75 on which the cam follower 76 is formed is indicated by 02. When the disk 62 is subjected to a torque MO, the cam follower 76 is acted upon by a force FO at point P. The force FO is given by $$FO = MO/lO$$

where lO is the distance between the rotating center 01 and the point P. The force FO is a resultant vector of a component force F1 passing through the point P and the center of the cam follower 76 and another component force F2. If we let $\theta$ stand for the pressure angle at point P, we obtain $$F1 = FO/\sin\theta$$

Since $\sin\theta$ is smaller than unity, $$F1 > FO$$

This means that the force F1 is far greater than the force FO when the pressure angle $\theta$ is small.

If we let the length of a line drawn from the point 02 perpendicular to the force F1 be l1, the rotating torque M1 acting upon the follower lever 75 is given by $$M1 = F1 \cdot l1$$

The follower lever 75 is subjected to the rotating torque M1 which is obtained by further amplifying the force F1 so that the follower lever 75 can be rotated by a small motor.

On the other hand, the known cam follower 76, as mentioned earlier, generally stops at one end 70*a* or at the other end 70*b* of the cam groove 70 but not halfway in the communicating groove 71. However, during manual operation, it may sometimes stop midway in the communicating groove 71 for one reason or another. In such a case, the disk 62 cannot be rotated by the motor M.

It was therefore proposed by the aforementioned patent application to form a curved chamfer to the ends 70*a*, 70*b* of the cam groove 70 in order to overcome this problem. However, depending on the shape of the curved chamfer, the pressure angle $\theta$ between the cam follower 76 and the curved chamfer may become very large. When the pressure angle $\theta$ is very large, the rotating torque M1 acting on the follower lever 75 becomes very small, leading to a possible failure of a small motor output to turn the follower lever 75.

Figure 9:
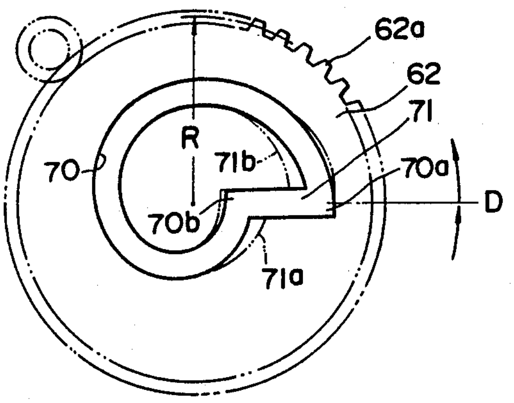
FIG. 9 is an explanatory drawing showing the relation between the shape of the cam groove in the rotating member of this invention and that of the conventional cam groove.

To eliminate this problem, the present invention proposes to form unique recessed walls 71*a*, 71*b* in the cam groove 70 of the disk 62, as shown in FIG. 9. The shape of these recessed walls will be explained in the following.

Figure 14A:
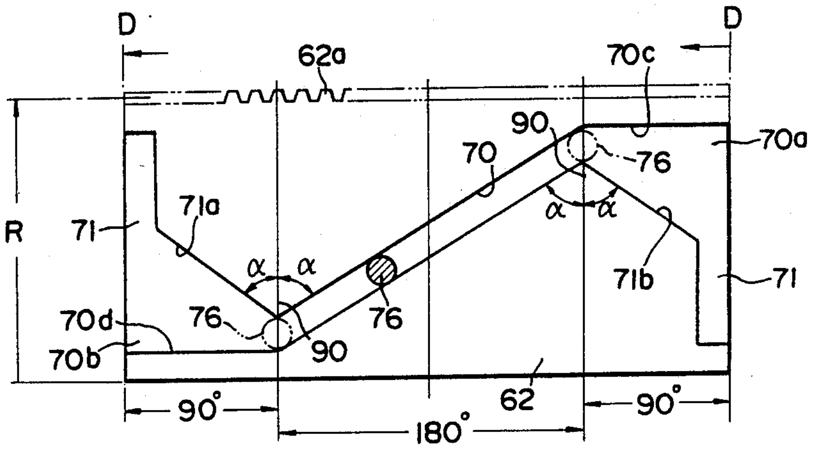
FIG. 14A is an exploded view showing the cam groove of this invention formed in the rotating disk.
Figure 14B:
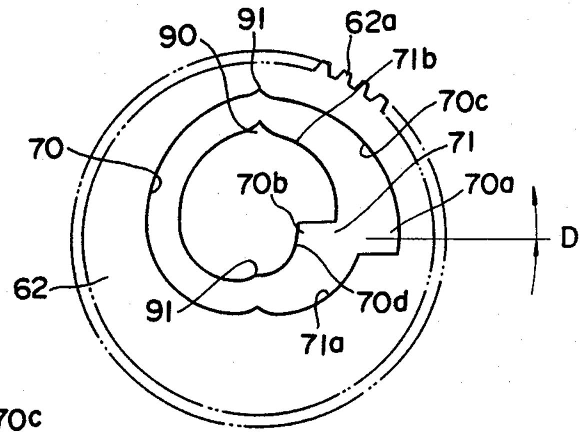
FIG. 14B is a plan view of the rotating disk of FIG. 14A.

FIG. 14A is an exploded view of the rotating disk 62 of this invention shown in FIG. 9, separated at a radial dividing line D for explosion. The upper edge in FIG. 14A signifies the teeth 62*a* and the lower edge denotes the center of the rotating disk 62.

The side wall 70*c* on the radially outward side of the cam groove 70 has a constant radius for the first 90 starting with the dividing line D. For the next 180° the radius of the side wall 71C gradually decreases and for the last 90° it progressively increases. The last 90° part forms the recessed wall 71*a*. The side wall 70*d* on the radially inward side of the cam groove 70 is formed totally reverse to the side wall 70*c*. For the first 90° the recessed wall 71*b* is formed. A side wall 71*d* formed between the walls 70*d* and 71*b* is paralled to the side wall 71*c*. The side walls 71*a*, 71*b*, 71*c*and 71*d* make an angle of $\alpha$ with radial lines to form the same pressure angle of $\theta$ with respect to the cam follower 76.

Thus, if, when the cam follower 76 stops in the communicating groove 71 and the disk 62 is rotated by the motor in either direction, the cam follower 76 comes into contact with the recessed wall 71*a* or 71*b* with the normal pressure angle $\theta$, so that the cam follower 76 can be moved.

Figure 13:
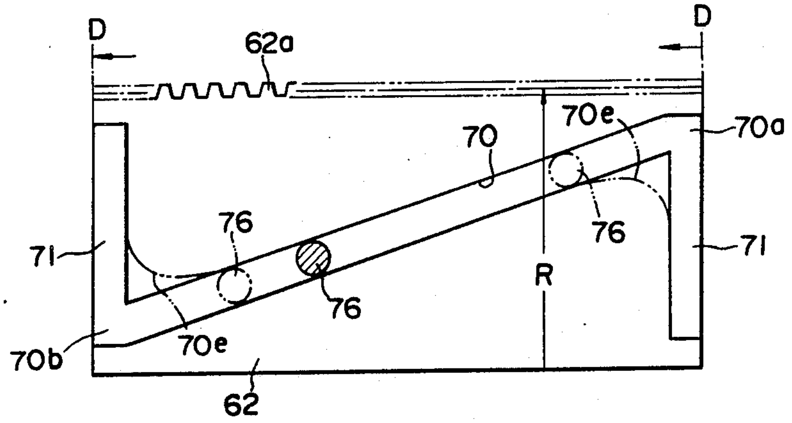
FIG. 13 is an exploded view showing the conventional cam groove formed in the rotating disk.

FIG. 13 shows the cam groove of the conventional device exploded in the same manner as with FIG. 14A. The rounded or curved surface 70*e* indicated by the imaginary line is a simple curved recess, so that there are times when the pressure angle between the cam follower 76 and the curved surface 70*e* becomes so large that the cam follower 76 cannot be moved by a small motor. Furthermore, the cam follower 76 moves radially only to where the curved surface 70*e* is formed, that is, the movement of the cam follower 76 is not sufficient. This gives rise to a problem that the cam follower 76 may not be able to move to the complete lock position or unlock position.

In FIG. 14A, suppose the cam follower 76 has come to the position (indicated by the imaginary line) where it opposes the bent portion 90 bordering the cam groove 70 and the recessed walls 71*a*, 71*b* and the motor has failed. At this time since the disk 62 cannot be rotated by the motor, the lock lever 31 will have to be moved manually. However, if the cam follower 76 is positioned completely opposite to the bent portion 90, the cam follower 76 will not move when it is attempted to move the cam follower 76 in the radial direction because the cam follower 76 and the edge of the bent portion 90 engage resisting the movement of the cam follower 76. The disk 62 therefore will not rotate. This means the lock lever 31 cannot be switched manually.

Figure 15B:
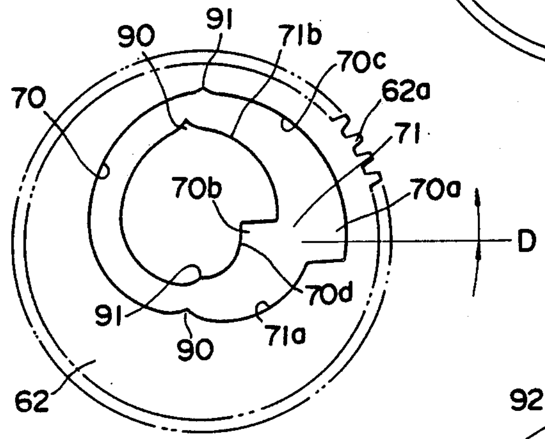
FIG. 15B is a plan view of the rotating disk of FIG. 15A.
Figure 15A:
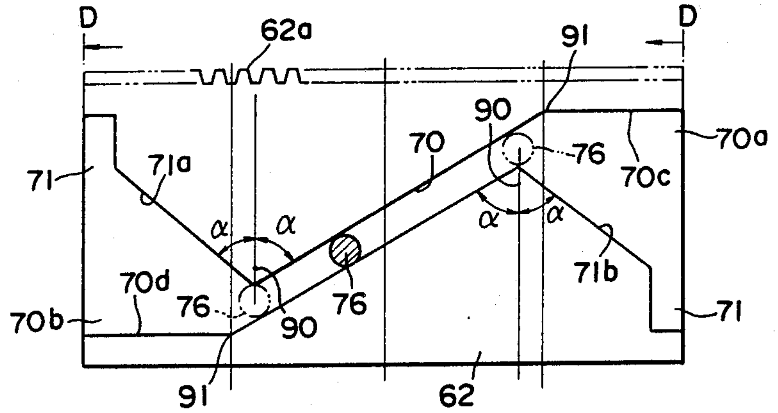
FIG. 15A is an exploded view showing another example of the r disk of this invention.

FIG. 15A shows another embodiment of the invention that can overcome the above problem. In this embodiment the bent portion 90 is located so that its position does not coincide with that of an opposite bent portion 91 formed on the other side wall of the cam groove 70. Because of this arrangement, when the cam follower 76 is on the imaginary line position, the disk 62 can be rotated by moving the cam follower 76 in either of the radial directions to bring the cam follower 76 into contact with the cam groove 70 with the pressure angle of $\theta$. This puts the cam follower 76 off the complete opposing relationship with the bent portion 90.

That is, in FIG. 15A, when the cam follower 76 indicated by the imaginary line in the lower left is moved downwardly, it contacts the inclined surface **71*d* of the cam groove 70, causing the disk 62 to turn to the right with the result that the cam follower 76 comes to the position where it opposes the bent portion 91. In this condition, when the cam follower 76 is moved upwardly (radially outwardly), it pushes the recessed wall 71*a* causing the disk 62 to rotate permitting the cam follower 76** to move to the unlock position on the outside.

The actual shape of the cam groove corresponding to FIG. 15A is shown in FIG. 15B.

Figure 16B:
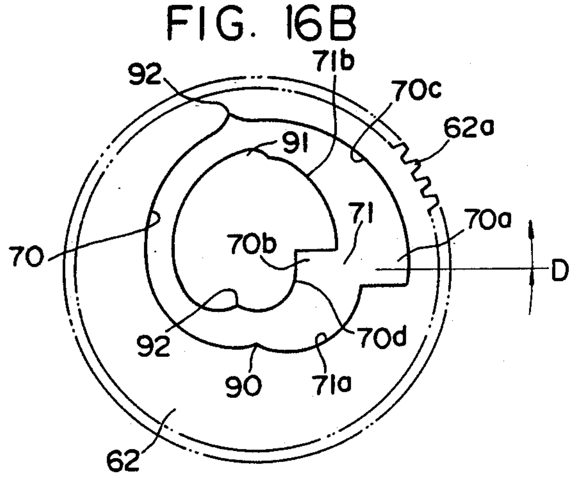
FIG. 16B is a plan view of the rotating disk of FIG. 16A.
Figure 16A:
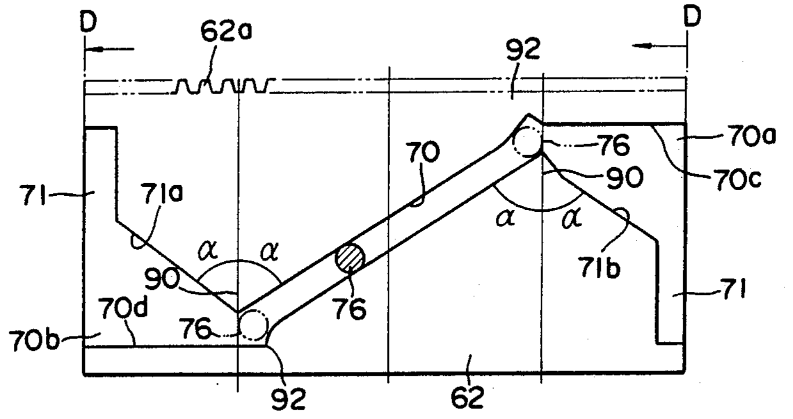
FIG. 16A is an exploded view showing a further example of the rotating disk of this invention.

In the example of FIG. 15A and 15B, the bent portion 90 is shifted from the opposing bent portion 91. In the example of FIG. 16A and 16B the both ends of the side walls of the cam groove 70 are recessed, instead of changing the location of the bent portion 90, so that the opposite bent portion 92 is shifted in position from the bent portion 90. In this way, the relative positional relationship between the two bent portions 90, 92 can be changed to obtain the same result.

In this invention, instead of the rotating disk 62, a non-plate rotating member may be used.

Figure 17:
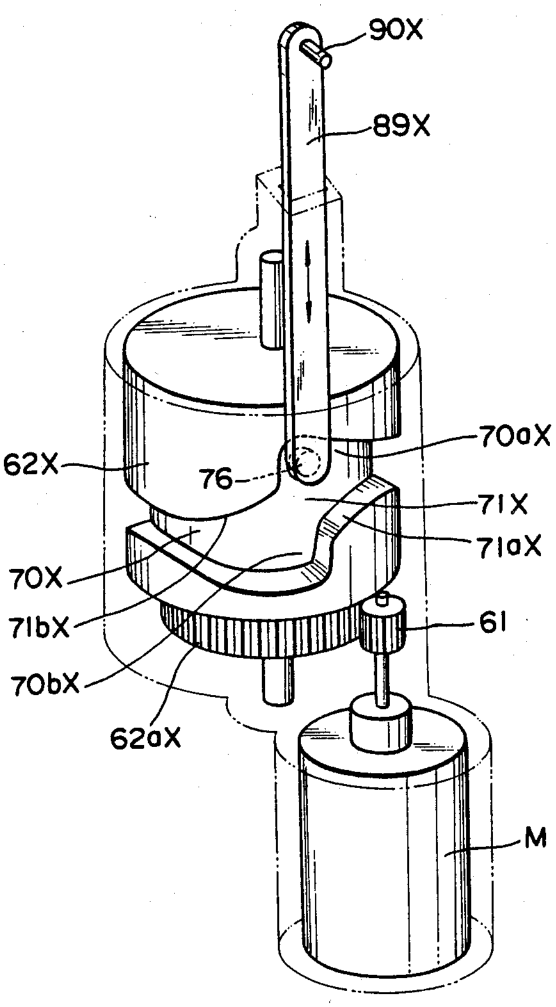
FIG. 17 a perspective view showing another example of the rotating member of this invention.

FIG. 17 shows an example in which a rotating cylinder is used instead of the rotating disk 62. On the peripheral surface of the rotating cylinder 62X is formed a cam groove 70X with a communicating groove 71X connecting the ends **70*a*X and 70*b*X of the cam groove 70X. The rotation of the motor M is transmitted through a pinion 61 to the rotating disk 62*a*X and to the rotating cylinder 62X. This causes a follower lever 89X supporting the cam follower 76 to move in the direction of arrow, i.e. in the direction of the axis of the rotating cylinder. The recessed walls are indicated by 71*a*X and 71*b*X**.

This invention is intended for applications where an arbitrary member such as the lock lever 31 which is required to be shifted to either of two different positions (lock position and unlock position) needs to be moved between the two positions. Such two positions are, in the following claims, signified as first and second positions and the member corresponding to the lock lever 31 is represented as a displacement member.

Application examples of the principle of this invention other than the door locking device may include an actuator for the automotive head lamp which can project from or retract into the body.

I claim:

1. An actuator for an automotive door locking device comprising:

a rotating member 62 that is rotatable by a power source M;

a cam groove formed in the rotating member 62;

a cam follower 76 that moves along the cam groove; and a lock lever 31 which moves between a lock position and a unlock position as a result of the movement of the cam follower 76;

the cam groove having a first groove 70 for moving the lock lever 31 between the lock position and the unlock position and a second groove 71 for moving the cam follower 76 between the ends **70*a*, 70*b* of the first groove 70 without using the first groove 70, the first groove 70 having on one of its side walls at least a first inclined wall 71*c*, for moving the cam follower 76 from one end 70*a* of the first groove 70 to the other end 70*b* and a second inclined wall 71*a*, which is inclined reverse to the first inclined wall 71*c***;

the first groove 70 having on the other side wall at least a third inclined wall **71*d*, for moving the cam follower 76 from the second end 70*b* to the first end 70*a* of the first groove 70 and a fourth inclined wall 71*b*, which is inclined reverse to the third inclined wall 71*d***;

whereby the first through fourth inclined walls **71*a*, 71*b*, 71*c*, 71*d* of the first groove 70 are cut in such a way that the pressure angles between the cam follower 76 and the first through fourth inclined walls 71*a*, 71*b*, 71*c*, 71*d*** are almost constant.

2. An actuator as set forth in claim 1, wherein a bordering portion between the first inclined wall and the second inclined wall on one of the side walls or the first side wall of the first groove is located opposite to the third inclined wall on the other side wall or the second side wall of the first groove, and the bordering portion between the third inclined wall and the fourth inclined wall on the second side wall of the first groove is located opposite to the first inclined wall on the first side wall of the first groove.

3. An actuator as set forth in claim 1, wherein a recess is formed on the second side wall of the first groove where it opposes the bordering portion between the first inclined wall and the second inclined wall on the first side wall of the first groove and another recess is formed on the first side wall of the first groove where it opposes the bordering portion between the third inclined wall and the fourth inclined wall on the second side wall of the first groove so that when the cam follower is manually advanced into the recesses, the rotating member can be rotated.

* * * * *